United States Patent Office 3,667,970
Patented June 6, 1972

3,667,970
PROCESS FOR PRESERVING MEAT
Juergen Scheide, Holzminden, Germany, assignor to Farbenfabriken Bayer Aktiengesellschaft, Leverkusen, Germany
No Drawing. Continuation-in-part of abandoned applications Ser. No. 822,290 and Ser. No. 822,291, both May 6, 1969. This application June 3, 1971, Ser. No. 149,813
Claims priority, application Germany, May 10, 1968, P 17 67 438.3, P 17 67 439.4
Int. Cl. A23b 1/00, 3/00
U.S. Cl. 99—169
9 Claims

ABSTRACT OF THE DISCLOSURE

The surface of fresh meat is treated with a mixture of from 2–30% by weight of a monoglyceride and from 98–70% by weight of a di- or triglyceride of paraffinic or olefinic carboxylic acids with from 8–22 carbon atoms to form a coherent film over the meat surface to improve the storageability and quality of the meat.

This application is a continuation-in-part of applications Ser. Nos. 822,290 and 822,291, both filed on May 6, 1969 and now abandoned.

This invention relates to a process of treating the meat of animals.

In the industrial preparation and distribution of meat of warm-blooded animals a whole series of precautionary measures is taken in order to prevent chemically, physically, and chemical-microbiologically caused changes in these foodstuffs for a certain period of time, or to extend possible storage times before spoilage sets in.

It is known that meat of warm-blooded animals remains palatable longer when the meat is stored and distributed at low temperatures. As an optimum temperature range, temperatures of from 0° C. to 6° C., are maintained. Such meat is preservable for only a few days from the time of commercial sectioning and packaging under correct maintenance of the prescribed cooling temperatures. After that it is no longer saleable as fresh meat and must be otherwise utilized. Responsible for this low degree of preservability are the post-mortem changes setting in after slaughter of the animal. These post-mortem changes constitute biochemically irreversible alterations in the colloidal-chemical swelling state of the meat protein which results in a continuously increasing dehydration of the meat protein accompanied by changes in the permeability of the membranes. This dehydration manifests itself in loss, by seeping out, of the meat juice, in which are dissolved valuable meat protens, amino acids, carbohydrates, and flavor components, such as the salts of ribonucleic acids. As a result of the use of cutting and beating utensils in the slaughtering and cutting process, the loss of meat juice is accelerated by destruction of a relatively high number of the tubular muscle fibers whereby a rapid outflow of meat juice occurs at the points of injury. The loss of juice of the cut meat causes substantial technological difficulties in the distribution and storage of the packed cuts and at the same time represents a significant economic loss of protein. In addition, meat juice is, because of its high water content, an especially ideal nutrient medium for micro-organisms. Beginning with the rapid spoilage of the meat juice, the microbiological spoilage of the entire package proceeds quickly. To alleviate these difficulties, there have been developed packaging materials which are made of highly absorptive materials, such as, for example, treated cellulose, which is, however, not palatable itself. The juice seeping from the cut meat is absorbed to a substantial degree by the packing material. This form of packaging, however, does not extend the limited time of preservability of a few days, at temperatures from 0° C. to 6° C., but only makes possible the distribution of commercially packed fresh meat. Sufficient free meat juice remains to promote rapid microbial spoilage. Simultaneously, there is a substantial loss in meat juice absorbed by the packing material. It is also known to subject fresh meat immediately after cutting to a low-temperature freezing process at −40° C. and to store this deep frozen meat at a temperature of from −16° to −20° C., especially at −18° C., to extend its preservabity. According to this process, a storageability of up to 12 months can be attained. However, even in this process considerable technical difficulties are caused by the above described post-morten changes as a result of dehydration of the proteins and the loss of meat juice. The meat cuts are stacked prior to deep-freezing on conventional packaging materials and are then wrapped with a transparent packaging film. As a result of the high juice content of the meat surface and the high degree of water vapor saturation on the inside of the film wrapper containing the meat, a thick layer of ice crystals is formed, upon chilling, both on the meat surface and the inner film surface so that the meat cut itself is no longer visible after deep-freezing. To avoid these difficulties, several technical methods are used to make at least part of the meat cuts visible, but this involves a substantially higher cooling requirement.

The industrial production of proteins derived from cold-blooded animals and the processing and distribution of such porteins is of great significance as a food source for man. Involved are albumins which meet all nutritional-physiological requirements and are of sufficiently low cost to make them accessible to all population groups. The supply in the oceans of fish of all types fit for human consumption has by no means been fully exploited. One reason for this is the fact that proteins derived from cold-blooded animals degrade much more rapidly into unpalatable foodstuff after killing of the animals than is the case, for instance, with meat derived from warm-blooded animals. Post-morten changes which begin immediately after killing of the animals lead to, after only a few hours, characteristically strong and unpleasant smelling degradation products consisting primarily of chemical compounds of the amine group, such as trimethylamine. These changes occur even when the killed animals or the cut meat are immediately cooled with ice, even though the changes can be somewhat delayed thereby. In most cases the fish protein must be transported from remote fishing grounds on the open seat to deep inland locations in order to reach the consumer. The fish product then offered for sale already has the unpleasant fish odor despite careful control of the requisite cooling conditions, i.e., maintenance of temperatures which may not substantially exceed 0° C.; the sales value of the resulting fish product is, of course, substantially reduced. Also responsible for this are other post-mortem changes which involve various rotting processes because the capture and slaughter of the animals offers may possibilities for infection by microorganisms of the group causing spoilage of foodstuffs.

Because of the low content of sarcolemma in the muscles of the fish and the concomitant loose structure, fish loses, especially after thawing, its meat juice very quickly which leads to increased proliferation of the spoilage-causing microorganisms and, consequently, to accelerated spoilage. These processes occur in fish caught on the open ocean as well as in inland waters and in ponds. Accordingly, many attempts have been made to increase the production and the consumption of fish proteins through improvement of the quality of the fish products offered to the consumer as well as through prolongation of the storage and keeping properties of the fish. In recent years fish proteins, either in the form of the whole animal from which the innards have been removed or in the form of cut parts, have increasingly been subjected to freezing processes imediately after killing and cleaning of the animals. This procedure has the advantage that the protein is still in a rigor mortis condition and the formation of unpleasantly smelling and tasting degradation products is suppressed. The freezing process can be carried out at a temperatures of −40° C., −20° C., or at temperatures somewhat below 0° C., for example, by shock freezing in appropriate equipment or merely by putting the fish on ice. The storage stability and quality of the fish protein thus processed is diminished when the higher temperatures are used in the freezing process and storage. The process giving best results is the quick freezing at temperatures from −30° to 40° C. in which the critical temperature around −0.5° C. is passed through especially rapidly.

This procedure, however, has major deficiencies both during the freezing processes and during storage. As a result of the rapid loss in meat juice from, and drying out of, the fish proteins during the freezing operation, weight loss and albumin denaturation occur and the fish product has an unattractive appearance. In addition, the product is discolored and may become rancid. During the frequently occurring long storage periods of several months the drying out of the product is increased through sublimation of ice from the surface of the protein and concomitant albumin denaturation which, after cooking, leads to a dry and straw-like, insipid-tasting food.

The objective of the present invention is to eliminate these difficulties in order to make available to the consumer inexpensive fish proteins in such quality that after preparation in the kitchen they have a juicy, tender, and fresh taste. This is done by processing the proteins in such a way that the seepage of meat juices prior to the freezing process and the drying out during storage is prevented.

It has now been found that the fresh meat of warm-blooded animals can be given favorable properties by treating its surface with a coherent film of a mixture of (a) from 2% to 30% by weight of one or more monoglycerides; and
(b) from 98% to 70% by weight of one or more diglycerides and/or triglycerides of paraffinic and/or olefinic carboxylic acids containing from 8 to 22 carbon atoms and free of acetylenic unsaturation.

In accordance with the invention we prefer to use the glycerides of naturally occurring un-branched carboxylic acids suitable for dietetic purposes. Examples of carboxylic acid glycerides of this kind include the uniform and/or mixed glycerine esters of caprylic acid, caproic acid, myristic acid, palmitic acids, stearic acids, arachic acid, oleic acid, linolic acid, linoleic acid and erucic acid. The following compounds are mentioned in particular: tricaproin, tricaprinin, trilaurin, trimyristin, tripalmitin, tristearin, triarachin, triolein, trilinolin, trilinolenin, trierucanin; 1,2-dicaprion, 1,3-dicaprinin; 1,2-dilaurin, 1,3-dilaurin; 1,2-dimyristin, 1,2-dipalmitin, 1,3-dipalmitin; 1,2-distearin, 1,3-distearin; 1,2-diarachin, 1,3-diaracin; 1,2-diolefin, 1,3-diolein; 1,2-dilinolin, 1,3-dilinolin; 1,2-dierucain, 1,3-dierucain; 1-monolsurin, 2-monolsurin; 1-monostearin, 2-monostearin; 1-monoerucain, 2-monoerucain; 1-palmityl-2-stearyl-3-oleylglyceride; and 1,2-dioleyl-3-palmityl glyceride, and 1,3-dioleyl-2-palmityl glyceride.

We prefer to use mixtures of these compounds. Triglyceride or mixtures of different triglycerides of the kind occurring in the form of liquid and solid vegetable and animal fats are preferred, in particular mixtures of triglycerides which are liquid at normal temperature or triglyceride mixtures with the monoglycerides and diglycerides of the carboxylic acids already mentioned above.

These mixtures show optimum handling properties according to the invention when their ingredients have been mixed with one another in such ratios that at room temperature the completed mixtures are gel-like and pasty in consistency and show thixotropic properties. These particular properties can be attained by, for example, stirring the mixture to a homogeneous mixture, heating same to 65° C. and immediately cooling it to 20° C. This has the advantage that, following their preparation, the mixtures change from liquids into gel-like pastes on completion of mechanical processing. During their application in accordance with the invention, however, the mixtures revert to the easily handled liquid form due to the mechanical stresses to which they are subjected. After they have been used in accordance with the invention, the mixtures are converted back into gel-like pastes, thereby forming transparent, firmly adhering and coherent films over the surface of the meat. It is of advantage inter alia to use mixtures containing the monoglycerides, for example, in quantities of from approximately 2% to 30% by weight. Especially advantageous results are obtained when the monoglycerides are used in amounts of from 3 to 10% by weight. In addition, it can also be of particular advantage to use monoglycerides and diglycerides with 16 and 18 carbon atoms of the kind obtained very simply for example by transesterifying naturally occurring fats and oils with palmitic acid or stearic acid. These monoglycerides and diglycerides obtained by transesterification may also contain small quantities of monoglycerides and diglycerides of saturated and unsaturated carboxylic acids with from 8 to 14 carbon atoms or with from 8 to 16 carbon atoms. The mixtures employed in accordance with the invention may also be employed in the form of solutions, in which case the liquid glycerides of naturally occurring carboxylic acids with from 2 to 6 carbon atoms, for example, are used as solvents. On the other hand, it is not desirable to employ the mixtures used in this invention in the form of emulsions.

In the present context, meat includes, for example, the meat obtained from warm blooded animals such as pigs, cattle, sheep, poultry, and the like, as well as the meat of cold blooded animals such as fish, shellfish, and the like. The meat treated can be cut up or can constitute whole fish such as trout.

So far as treatment is concerned, a firmly adherent and completely impervious layer of the glycerides used in accordance with the invention must be formed over the surface of the meat. To this end, it is necessary to balance the mixture in its composition in such a way as to guarantee adequate bond strength and film-forming capacity. It is also of particular advantage to produce this layer in such a limited thickness that it appears transparent while the piece of meat remains intact as regards its original appearance without any changes in the impervious seal over the pores of the meat. This result can be obtained, for example, by brush coating or by applying the glyceride mixture according to the invention to the surface from a nozzle with the assistance of a compressed gas. Depending on the nature of the surface of the meat to be treated, amounts of from 0.5 to 2.0% by weight of the mixtures used in this invention, based on the fresh weight of the meat, are advantageously used. The usual compressed gases, such as compressed air, nitrogen, carbon dioxide, nitrous oxide, propane, butane and fluorinated hydrocarbons may be used as the propellent gases. Favourable results as regards the transparency of the film applied, the pore seal and the consumption of material are obtained for example by operating at pressures of from 3 to 7 atms. and in particular at pressures of from 5 to 6 atms. and simultaneously using nozzles with a diameter of from 0.6 to 1.4 mm. and in particular from 0.8 to 1.0 mm. When using such a technique, it is desirable to carry out the treatment with the mixtures used in this invention at room temperature (20° C.) or lower temperatures. Application of the film under the conditions according to the invention may be carried out both with manually operated devices and with fully automatic devices. However, the mixtures compressed and prepared in accordance with the invention may be accommodated in various kinds of packs, e.g. pressure packs from which they can be dispersed through a valve system with the assistance of propellent gas under pressure.

The mixtures of the invention may be applied in accordance with the invention either as such or following the addition of further digestible additives, such as for example, proteins, carbohydrates and natural aromatizing agents and flavorings. Suitable proteins include, for example, proteolytically active enzymes, such as papain, ficin and bromelin, while examples of suitable carbohydrates include monosaccharides, such as glucose, galactose and ribose. Extracts and distillates from natural spices and the salts of glutamic acid and the ribonucleic acids are examples of natural aromatizing agents and flavorings. In this context, extracts and distillates of natural spices, include, for example, the etheric oils and extracts of pepper, nutmeg, mace, capsicum, cloves, coriander, ginger, caraway, cardamon, marjoram, thyme, juniper, bay leaves, celery, dill and tarragon. Among the salts of glutamic acid and the ribonucleic acids, the monosodium salt of glutamic acid and the disodium salts of inosine-5'-monophosphoric acid and of guanosine-5'-monophosphoric acid are particularly preferred. These additives may be incorporated in the mixtures by dissolution or suspension. In the process according to the invention, the fresh meat is treated in such a way that a continuous film protects the surface of the meat. Accordingly, the meat remains more juicy. The addition of certain proteolytic ferments promotes partial proteinolysis of the connective tissues of the meat, with the result that the food prepared for consumption is much more tender. The use of carbohydrates, pentoses in particular, promotes a rapid uniform browning of the surface of the treated meat, with the result that rapid crust formation and hence a further increase in juiciness are obtained, in addition to which the overall appeal is increased by the particularly appetizing appearance. Finally, it is possible by adding the natural aromatizing agents and flavorings to make even the inside of the meat particularly spicy, so that the appeal of the prepared food is still further improved. The additives according to the invention may be added to the glyceride mixtures according to the invention either individually or in the form of mixtures with one another. The treatment of meat in accordance with the invention enables domestic preparation to be carried out at grilling, frying and roasting temperatures of from 150 to 160° C. at which physiologically noxious carcinogenic substances are unable to form as a result of pyrolytic changes in the glycerides. Accordingly, intensively browned pieces of meat with a juicy taste and an appetizing appearance are obtained in every case with reasonable grilling, frying and roasting times. In the process according to this invention, the meat is treated in such way that the loss of meat juice is reduced to a minimum or eliminated entirely. In this way, the microbiological conditions are changed to result in longer periods of preservablity. At the same time, the economic loss of valuable proteins is reduced or obviated, which also results in juicier condition of the finally prepared meat cut. In the deep-freezing of treated fresh meat, the formation of ice crystals is substantially avoided without requiring greater cooling capacity.

The preparation and the compositions and properties according to the invention of the mixtures and their application in accordance with the invention are illustrated by the followng examples.

EXAMPLE 1

(A) In order to prepare a mixture according to the invention, two batches were made up, each of 100 g., of the following compositions:

(a)

5 g. of pure glycerine monostearate and
95 g. of liquid triglyceride mixture; and (b)

25 g. of pure glycerine monostearate and
75 g. of liquid triglyceride mixture.

In both cases, a mixture of olive oil and refined rape oil in a ratio of 1:2 was used as the liquid triglyceride mixture. The carboxylic acid component of the olive oil consisted essentally of 76% of oleic acid, 7% of palmitic acid, 2% of stearic acid and 5% of linolic and linoleic acids, while approximately 60% of the carboxylic acid component of the refined rape oil consisted of trierucain.

In order to obtain the requisite thixotropic properties, the mixture was initially heated with stirring to a temperature approximately 5° C. higher than the melting point of the glycerine monostearate, that is, to 65° C. The mixture was left standing at this temperature until it was in the form of a homogeneous liquid. The liquid was then quickly cooled to room temperature (20° C.) and the resulting mass was poured into suitable containers. After a while, the mass solidified into a gel-like paste which showed little or no flow properties. The mass could be converted into a free-flowing form at room temperature by intensive shaking or other mechanical working, and could be poured in such form into the supply container of a nozzle spray or into an aerosol can.

The following were treated with the mixture according to the invention:

5 pieces of rump steak with a fresh weight of 850 g.;
5 pieces of pork cutlet with a fresh weight of 650 g.; and
5 pieces of veal steak with a fresh weight of 605 g.

Immediately after it had been cut into portions, each individual piece of meat was sprayed all over with the mixture according to the invention (a) or (b), under the following conditions:

Two-component nozzle with a nozzle diameter of 1.4 mm.—
  Spraying pressure—3.0 atms.
  Propellent gas—nitrogen.

The mixture according to the invention was consumed in a quantity of 40 g., based on the total amount of meat. The individual pieces of meat were coated with a transparent but, as a result of gloss, still visible film.

In a parallel test, 5 pieces of rump steak with a fresh weight of 790 g.,
5 pieces of pork cutlet with a fresh weight of 670 g., and
5 pieces of veal steak with a fresh weight of 600 g.

were left untreated.

After cooking salt had been added to the treated and untreated pieces of meat in a quantity of 1% by weight, 5 pieces each of the rump steak, pork cutlet and veal steak treated in accordance with the invention were successively fried until done on both sides in the absence of further additives in a kitchen frying pan which was kept at a constant frying temperature of 160° C. by means of an electric cooking plate and a thermocouple. The frying time varied on average between 3.5 and 4 minutes, while the loss through frying varied between 12% and 15%. Pieces of meat with a juicy taste were obtained in every case.

Following the addition of a total of 90 g. of margarine, the samples which had merely been salted for the parallel test were fried until done on both sides in the frying pan under the same conditions. The frying varied on average between 6.5 and 7 minutes, while the loss through frying varied between 26% and 31%. In every case, pieces of meat which had a much drier taste as shown by a flavor test were obtained.

(B) When 1 g. and 2 g. amounts of the pentose xylose were respectively added to mixtures (a) and (b) according to the invention, the pieces of meat were much more uniformly browned and were given a more appetizing appearance.

EXAMPLE 2

In order to prepare a mixture according to the invention, two batches were made up, each of 100 g. of the following compositions:

(a)

5 g. of pure glycerin monostearate;
95 g. of liquid tri-glyceride mixture; and (b)

25 g. of pure glyceride monostearate, and
75 g. of liquid tri-glyceride mixture.

In both cases, olive oil was used as the liquid tri-glyceride mixture. The carboxylic acid component of the olive oil consisted essentially of 76% oleic acid, 7% of palmitic acid, 2% of stearic acid and 5% of linolic and linoleic acid.

In order to obtain the requisite thixotropic properties, the mixture was initially heated with stirring to a temperature approximately 5° C. higher than the melting point of the glycerine monostearate, that is, to 65° C. The mixture was left standing at this temperature until it formed a homogeneous liquid. The liquid mixture was then quickly cooled to room temperature (20° C.) and the resulting mass was poured into suitable containers. After a while the mass solidified into a gel-like paste which showed little or no flow properties. The mass could be converted into free-flowing form at room temperature by intensive shaking of other mechanical working, and could be poured in such form into the supply container of a nozzle spray apparatus. The following were treated with the mixture according to the invention:

5 pieces of rump steak with a fresh weight of 850 g.;
5 pieces of pork cutlet with a fresh weight of 650 g.;
5 pieces of veal steak with a fresh weight of 605 g.

Immediately after it had been cut into portions, each individual piece of meat was sprayed all over with the mixture according to the invention (a) or (b) under the following conditions:

Two-component nozzle with a nozzle diameter of 1.4 mm.—
  Spraying pressure—3.0 atms.
  Propellent gas—nitrogen.

The mixture according to the invention was consumed in a quantity of 40 g. based on the total amount of meat. The individual pieces of meat were coated with a transparent but, as a result of gloss, still visible film, and were stored in a freezing chest at 4° C. and maintained at this temperature for 7 days. At the end of the 7th day, the meat samples were removed from the chest and tested with respect to their weight loss and examined visually and by tasting. There was no visible loss as a consequence of juice seepage from the individual pieces of meat and this was confirmed by weighing. After preparation in the kitchen of various pieces of meat, no deleterious changes in taste could be noted. In a comparison test, the same number of samples of the different meat varieties were left without treatment and a part thereof was packed in a conventional non-absorbent container while the other part was packed in absorbent containers. The storage was carried out in the same freezing chest at 4° C. None of the samples was usable as fresh meat after the third day of storage and, for this reason, no taste was made. In the non-absorbent containers a substantial amount of meat juice had accumulated, amounting to 20 to 30% by weight of the total contents of each package. Loss of meat juice was greatest in the veal sample.

EXAMPLE 3

A mixture was prepared as described in Example 1 to contain the following constituents in a total of 1 kg.:

885 g. of a liquid tri-glyceride mixture;
80 g. of a mixture of glycerine mono-stearate and glycerine di-stearate in a ratio of 1:1; and
35 g. of a mixture of natural aromatizing agents and flavorings.

Peanut oil whose carboxylic acid component consisted essentially of 60% of oleic acid, 20% of linolic acid, 4.5% of stearic acid, 4% of arachic acid and 4% of palmitic acid was used as the liquid tri-glyceride mixture.

The mixture of glycerine mono-stearate and glycerine di-stearate was obtained by transesterifying vegetable oil with stearic acid and also contained 5% of monoglycerides and di-glycerides of other carboxylic acids occurring in vegetable oils.

The mixture of natural aromatizing agents and flavorings contained extracts and distillates of pepper, nutmeg, mace, coriander, bayleaves and onion, monosodium glutamate and a mixture of the disodium salts of inosine-5' - monophosphoric acid and guanosine - 5'-monophosphoric acid in a ratio of 1:1. Freshly cut pieces of meat were treated with this mixture according to the invention as described in Example 1:

5 pieces of rump steak with a fresh weight of 810 g.
7 pieces of veal cutlet with a fresh weight of 1450 g.

The working conditions were as follows:

Two component nozzle with a nozzle diameter of 1.2 mm.—
  Spraying pressure—4.0 atms.
  Propellent gas—dinitrogen monoxide A total of 25 g. of the mixture according to the invention was consumed. The individual pieces of meat were covered with a transparent almost invisible film and were stored in a cooling chest at 4° C. At the end of the 7th strogae day the samples were removed and examined. No weight loss was found. When the pieces of meat treated in accordance with the invention were fried, they had a spicy, juicy and meaty taste. The loss through frying amounted on average to 18% for a frying time of 5 minutes.

EXAMPLE 4

A mixture was prepared as described in Example 2 to contain the following constituents in a total of 1 kg.

785 g. of liquid triglyceride mixture;
90 g. of a mixture of pure glycerine monostearate with a mixture of glycerine monostearate and di-stearate in a ratio of 2:1;
95 g. of a mixture of natural aromatizing agents and flavorings; and
30 g. of a mixture of carbohydrates and proteins in a ratio of 2:1.

Refined rape oil of which approximately 60% consists of trierucain was used as the liquid triglyceride mixture. The mixture of natural aromatizing agents and flavorings contained extracts and distillates of naturally occurring spices. The pentose ribose was used as the carbohydrate while papain with an effectiveness of 60,000 units per gram was used as the protein.

The following freshly cut pieces of meat in the stated quantities were treated with this mixture in a test:

5 pieces of cutlet with a fresh weight of 630 g.
5 pieces of pork schnitzel with a fresh weight of 625 g.
5 pieces of veal schnitzel with a fresh weight of 620 g.
5 pieces of fillet steak with a fresh weight of 510 g.
5 pieces of rump steak with a fresh weight of 825 g.

The working conditions were as follows:

Two component nozzle with a nozzle diameter of 0.9 mm.—
   Spraying pressure—6 atms.
   Propellent gas—compressed air 21 g. of the mixtures according to the invention were consumed during the treatment. The treated pieces of meat were covered with a transparent, completely invisible film of the mixture according to the invention, and were packed in cartons with large windows which, in turn, were wrapped in transparent packaging film. The pieces of meat showed substantially no ice crystals upon freezing and were therefore visible in their original cut sections.

The pieces of each of the different types of meat were thawed and prepared for consumption after a storage period of 3 months, and possessed an appetizing appearance and a very tender, juicy and spicy taste in every case.

EXAMPLE 5

The mixture prepared in accordance with Example 4 from the ingredients mentioned in that example was used to treat five pieces of cutlet with a fresh weight of 650 g. in accordance with the invention. The working conditions were as follows:

Two-component nozzle with a nozzle diameter of 0.9 mm.—
   Spraying pressure—6.0 atms.
   Propellent gas—compressed air 4 g. of the mixture according to the invention were used for the treatment. The treated pieces of meat were used for the preparation of semi-cooked products by careful frying at a temperature of only 130° C. in such a way that although a uniform, average degree of browning was obtained over both surfaces, the meat was still raw inside. The individual pieces were then packed in preshaped aluminum foils and frozen in plate freezers for a period of 90 minutes at —40° C. The deep-frozen samples were placed in a deep-freeze cabinet and stored for 3 months at —18° C. The samples were then removed, left standing for 2 hours at room temperature and then placed in the sealed packs in an oven pre-heated to 250° C. After 25 minutes in the oven, the samples were removed hot, the packs opened and the pieces of meat sampled for taste. They had a fresh juicy, spicy taste reminiscent of roasted meat of extremely tender consistency.

EXAMPLE 6

A mixture was prepared as described in Example 1 with the following constituents in a total of one kg.:

930 g. of a liquid triglyceride mixture;
30 g. of pure glycerine monostearate;
25 g. of carbohydrates; and
15 g. of a mixture of natural aromatizing agents and flavorings.

Peanut oil whose carboxylic acid component consisted essentially of 60% of oleic acid, 20% of linolic acid, 4.5% of stearic acid, 4% of arachic acid and 4% of palmitic acid was used as the liquid triglyceride mixture. A mixture of glucose and ribose in a ratio of 2:1 was used as the carbohydrate. The mixture of natural aromatizing agents and flavorings contained extracts and distillates of pepper, celery, marjoram, thyme, rosemary and paprika, monosodium glutamate and a mixture of the disodium salts of inosine-5'-monophosphoric acid and guanosine-5'-monophosphoric acid in a ratio of 1:1. The mixture prepared in accordance with the invention was introduced in a quantity of 200 g. into an 18 oz. aerosol can which was provided internally with a double coating of protective lacquer and whose dimensions were as follows: diameter 65 mm., height 200 mm. and opening 1 inch. The can was then closed with a 1 inch valve, filled with 200 g. of a mixture of difluorodichloromethane and monofluorotrichloromethane in a ratio of 6:4 and provided with a spray head.

Two roasting chickens (a) and (b), both with the same initial weight of 745 g., were prepared in a test. After the chickens had each been sprinkled with 7.5 g. of cooking salt, they were mounted in a grill and grilled at a power consumption of 2 kilowatts while rotating. At the beginning of grilling, the chicken (a) was uniformly treated all over with the mixture according to the invention by actuating the valve of the aerosol can, a total of 4.1 g. of the mixture being consumed. After a total of 45 minutes, grilling, both the chickens were removed from the grill and their respective weight losses through grilling were determined. The chicken (a) had undergone a weight loss of 11.4% and the chicken (b) a weight loss of 19.7%. While the chicken (a) was uniformly and intensively browned and the meat from all parts of its body had a pleasant juicy and spicy taste, the chicken (b) had only been browned to a limited extent in patches and its meat tasted insipid and less juicy.

EXAMPLE 7

A mixture was prepared as described in Example 1 to contain the following constituents in a total of 1 kg.:

910 g. of liquid triglyceride mixture;
30 g. of a mixture of pure glycerine monostearate with a mixture of glycerine monostearate and distearate in a ratio of 2:1;
30 g. of a mixture of carbohydrates and proteins in a ratio of 2:1; and
30 g. of a mixture of natural aromatizing agents and flavorings.

A mixture of olive oil and refined rape oil in a ratio of 1:2 was used as the liquid triglyceride mixture. The carboxylic acid component of the olive oil consisted essentially of 76% of oleic acid, 7% of palmitic acid, 2% of stearic acid and 5% of linolic and linoleic acids, while approximately 60% of the carboxylic acid component of the refined rape oil consisted of trierucain. The pentose xylose was used as the carbohydrate, while the protease papain in pure form with an effectiveness of 60,000 units per gram was used as the protein. The mixture of natural aromatizing agents and flavorings contained extracts and distillates of pepper, capsicum, nutmeg, mace, coriander, onions and garlic.

The mixture prepared in accordance with the invention was poured into an aerosol can and sealed as described in Example 5, the only difference being that the mixture of propane and butane in a ratio of 1:1 was used as the propellant gas.

Two rump steaks were sprinkled with a little cooking salt, uniformly sprayed by actuating the valve on the aerosol can and placed with their sprayed sides, in a frying pan heated dry, up to about 150° C. The untreated sides of the pieces of meat were sprayed during frying, after which the meat was carefully fried on both sides until it had been intensively browned. The rump steaks were uniformly browned and had a very tender, juicy and spicy flavor.

EXAMPLE 8

A mixture was prepared from the constituents listed below in the stated amounts to make up 1 kg. of mixture:

860 g. of a liquid triglyceride mixture;
65 g. of a mixture of glycerine mono- and distearate in a ratio of 1:1;
45 g. of a mixture of natural aromatizing agents and flavorings; and
30 g. of carbohydrates.

Peanut oil whose carboxylic acid component consisted essentially of 60% of oleic acid, 20% of linoleic acid, 4.5% of stearic acid, 4% of arachic acid and 4% of palmitic acid was used as the liquid triglyceride mixture. The mixture of glycerine mono- and distearate was obtained by transesterifying vegetable oil with stearic acid, and also contained 5% of mono- and diglycerides of other carboxylic acids occurring in vegetable oils. Extracts and distillates of pepper, celery, lovage, mace and coriander together with monosodium glutamate and the disodium salts of inosine-5'-monophosphoric acid and guanosine-5'-monophosphoric acid were used as the mixture of natural aromatizing agents and flavorings. A mixture of the hexose glucose with the pentose ribose in a ratio of 1:2 was used as the carbohydrate component.

In order to obtain the requisite thixotropic properties, the mixture is initially heated with stirring in the required ratio to a temperature about 5° C. higher than the melting point of the mixture of glycerine mono- and distearates, i.e. to 65° C. The mixture is left standing at this temperature until it is in the form of a homogeneous liquid. This is followed by rapid cooling to room temperature (20° C.), after which the carbohydrates are suspended in the mass which is poured into suitable containers. After a while, the mass solidifies into a gel-like paste with little or no flow properties. The mass can be converted into a free-flowing form by intense shaking or other mechanical working, and can be poured in this form into the supply container of a nozzle spray or into an aerosol can.

Three freshly prepared cod fillets of a total weight of 552 g. were sprayed all over with mixture prepared in accordance with the invention by means of a 2-component nozzle, for which purpose a quantity of 5.1 g. was required. As a result, the cod fillets were surrounded all over by a continuous film of the mixture according to the invention. Following the addition of a little (approximately 1%) common salt, the fish fillets were fried until cooked on both sides without further additives in a kitchen frying pan which was kept at a constant frying temperature of 160° C. by means of an electric cooking plate and a thermocouple. The frying time was four minutes, and the loss in weight through frying amounted to 14.7%. The cod fillets were intensively browned all over and had a very juicy, spicy taste. In a parallel test, three cod fillets were left untreated. Their total weight was also 552 g. Following the addition to the frying pan of a little cooking salt and 40 g. of margarine, the fish fillets were fried under the same conditions until cooked. The frying time was 6 minutes and the loss in weight through frying amounted to 29.3%. The cod fillets were only slightly browned in patches and had a distinctly drier and more insipid taste than the fish fillets treated in accordance with the invention.

EXAMPLE 9

The mixture prepared in accordance with Example 1 from the same ingredients was introduced in a quantity of 200 g. into an aerosol can which was provided internally with a double layer of protective lacquer and whose dimensions were as follows: diameter 65 mm., height 200 mm. and opening 1 inch. The can was then closed with a 1 inch valve, filled with 200 g. of a mixture of propane and butane in a ratio of 1:1 and provided with a spray head.

Two perch fillets were sprinkled with a little cooking salt, uniformly sprayed by actuating the valve of the aerosol can and placed with their sprayed sides in a frying pan heated to about 150° C. The untreated sides of the fillets were sprayed during frying, after which the fish was carefully fried on both sides until it had been intensively browned. The perch fillets were uniformly browned and had a very juicy spicy taste.

EXAMPLE 10

Using a mixture prepared as in Example 1, three freshly prepared cod fillets of a total weight of 552 g. were sprayed all over with a mixture prepared as in Example 1 by means of a 2 component nozzle for which a quantity of 5.1 g. was required. The thus treated fillets were then placed in a deep-freeze and frozen at −18° C. The samples were then removed from the freezer after 14 days at a temperature of −18° C. and their weight determined. No weight loss was found. The fillets were then thawed and, after frying, had a juicy, tender and spicy taste.

In a parallel test, three freshly cut cod-fillets of a total of 462 g. were left untreated, frozen at −18° C. under the same conditions as above and also removed from the deep-freeze after 14 days of storage. The total weight of the fillets at this point was 401 g. corresponding to a weight loss of 13.2%. The thawed and fried fillets were much less juicy than those treated as above and had a definitely straw-like, insipid taste.

It will be appreciated that the instant specification and examples are set forth by way of illustration and not limitation and that various modifications and changes may be made without departing from the spirit and scope of the present invention.

What is claimed is:

1. A process for treating freshly processed meat, wherein the meat is coated with a coherent film of a thixotropic mixture of (a) from 2% to 30% by weight of at least one monoglyceride; and
   (b) from 98% to 70% by weight of at least one member of the group consisting of di-glycerides and tri-glycerides, wherein the said mono-, di-, or tri-glycerides are derived from the same or different aliphatic carboxylic acids free of acetylenic unsaturation containing from 8 to 22 carbon atoms.

2. A process as claimed in claim 1 wherein component (a) constitutes 3% to 10% by weight of the total mixture.

3. A process as claimed in claim 1 in which the mixture of components (a) and (b) is heated to 65° C. and then cooled sufficiently rapidly to 20° C. to impart thixotropic properties to the mixture.

4. A process as claimed in claim 1 wherein the mixture comprises (a) at least one member of the group consisting of mono-glycerides and di-glycerides; and (b) a mixture of different tri-glycerides naturally occurring in the form of a vegetable or animal fat or oil.

5. A process as claimed in claim 1 wherein a substantial portion of mono- and di-glycerides are derived from saturated carboxylic acids with 16 and 18 carbon atoms and constitute the transesterification products of naturally occurring fats and oils with palmitic acid and stearic acid.

6. Process as claimed in claim 1 wherein the mixture is used in amounts of from 0.5 to 2.0 percent by weight, based on the weight of the meat.

7. Process as claimed in claim 1 wherein proteins, carbohydrates and natural aromatizing agents and flavorings are added to the glyceride mixture.

8. Process according to claim 1 in which the coated meat is frozen and stored at temperatures below 0° C.

9. The product produced by the process of claim 2 in which the mixture is applied in 0.5 to 2.0 percent by weight of the meat and comprises (a) at least one member of the group consisting of mono-glycerides and di-glycerides; and (b) a mixture of different tri-glycerides naturally occurring in the form of a vegetable or animal fat or oil, a substantial portion of the mono- and di-glycerides being derived from saturated carboxylic acids and 16 and 18 carbon atoms and constituting the trans-esterification products of naturally occurring fats and oils with palmitic acid and stearic acid, the mixture of components (a) and (b) prior to application to the meat having been heated to 65° C. and then cooled sufficiently rapidly to 20° C. to impart thixotropic properties to the mixture.

References Cited
UNITED STATES PATENTS

| | | | |
|---|---|---|---|
| 2,982,660 | 5/1961 | Brissey et al. | 99—169 X |
| 3,406,081 | 10/1968 | Bauer et al. | 99—169 X |

HYMAN LORD, Primary Examiner

U.S. Cl. X.R.

99—157, 158